J. T. & G. METCALFE.
GEARING FOR TRACTION ENGINES.
APPLICATION FILED OCT. 6, 1911.
1,048,464.
Patented Dec. 24, 1912.
3 SHEETS—SHEET 1.
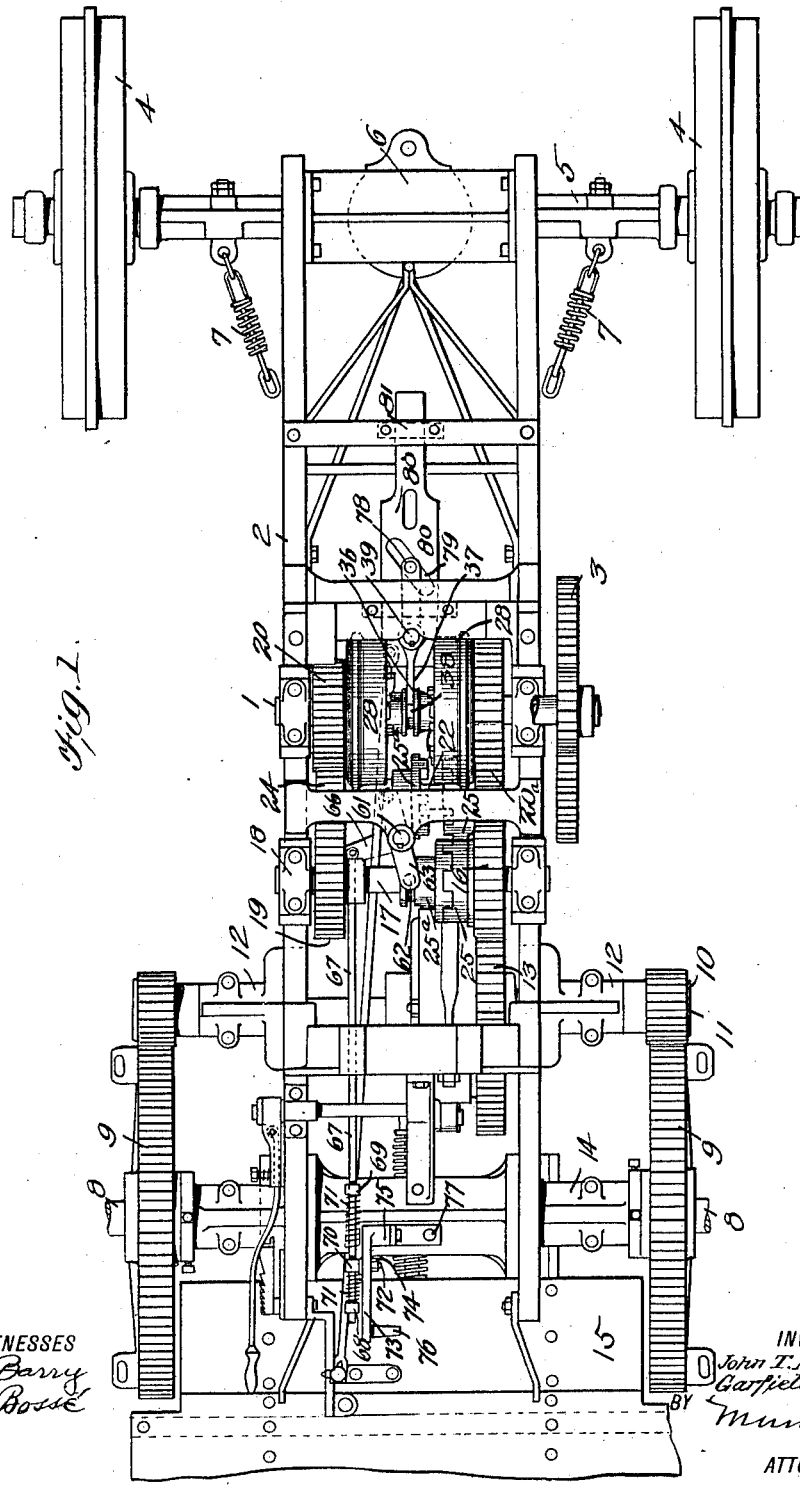
WITNESSES
H.C. Barry
H.J. Bosse
INVENTORS
John T. Metcalfe
Garfield Metcalfe
BY Munn & Co.
ATTORNEYS J. T. & G. METCALFE.
GEARING FOR TRACTION ENGINES.
APPLICATION FILED OCT. 6, 1911.
1,048,464.
Patented Dec. 24, 1912.
3 SHEETS—SHEET 2.
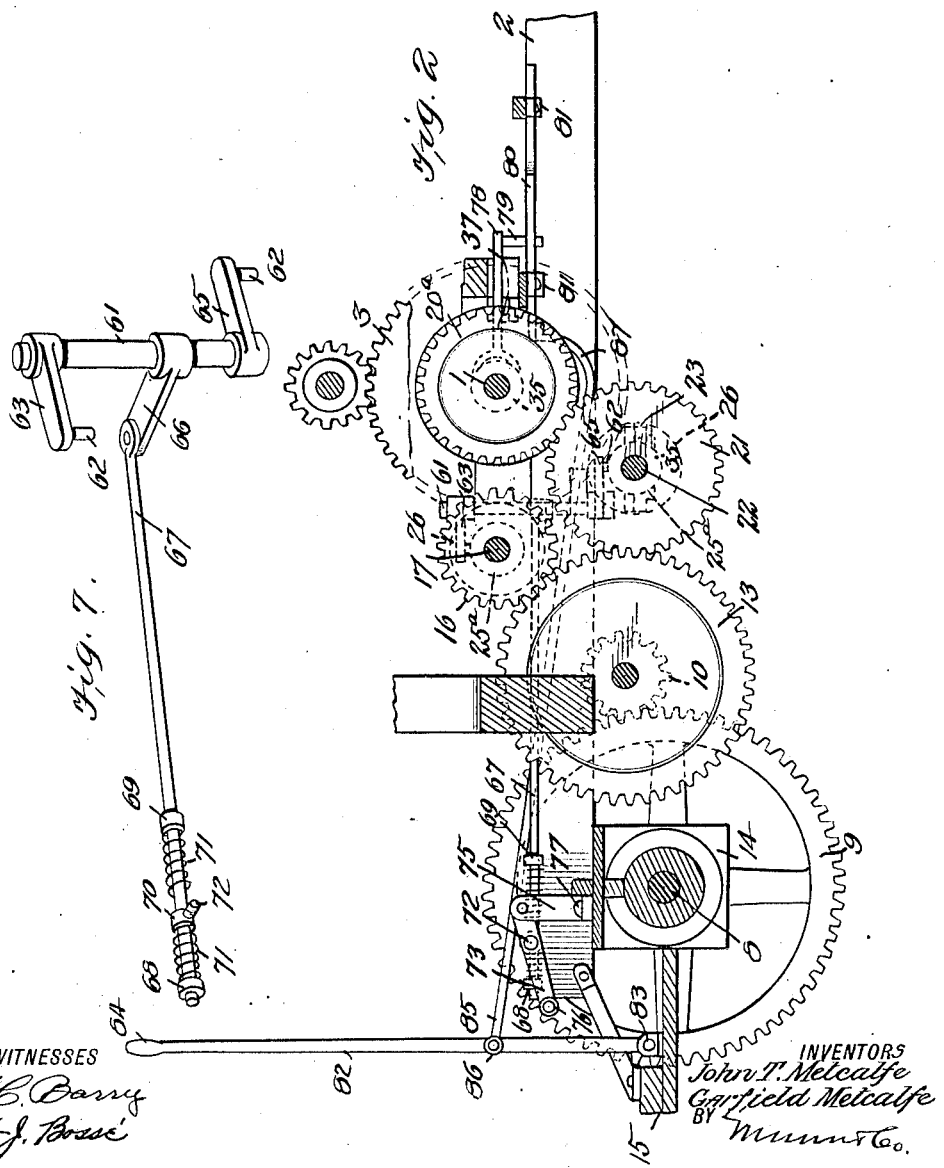
WITNESSES
H. C. Barry
H. J. Bossé
INVENTORS
John T. Metcalfe
Garfield Metcalfe
BY Munn & Co.
ATTORNEYS J. T. & G. METCALFE.
GEARING FOR TRACTION ENGINES.
APPLICATION FILED OCT. 6, 1911.
1,048,464.
Patented Dec. 24, 1912.
3 SHEETS—SHEET 3.
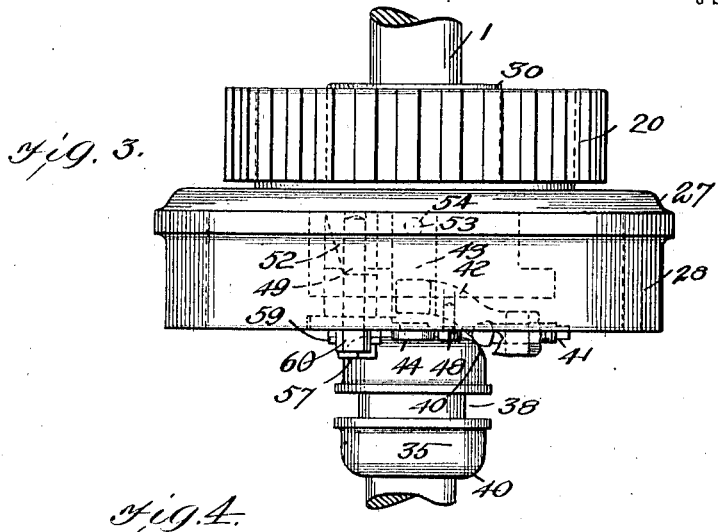
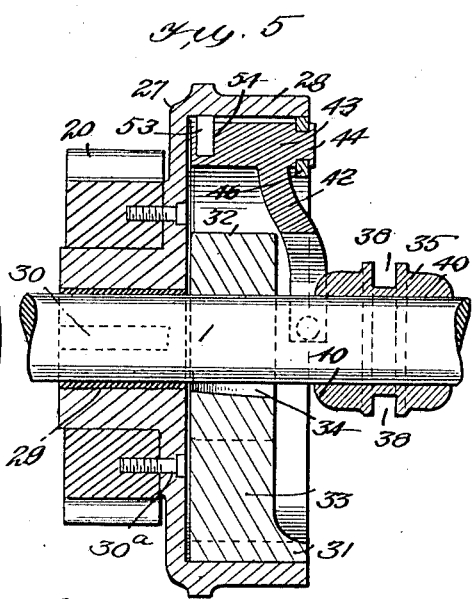
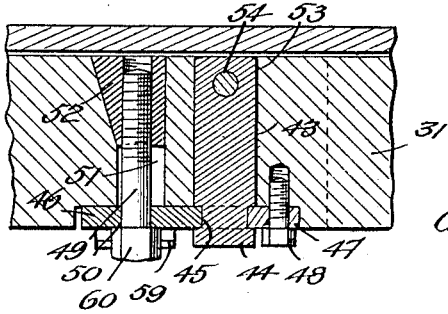
WITNESSES
INVENTORS
John T. Metcalfe
Garfield Metcalfe
BY Munn & Co.
ATTORNEYS

UNITED STATES PATENT OFFICE.

JOHN T. METCALFE AND GARFIELD METCALFE, OF QUINCY, PENNSYLVANIA.

GEARING FOR TRACTION-ENGINES.

1,048,464.  Specification of Letters Patent.  Patented Dec. 24, 1912.

Application filed October 6, 1911.  Serial No. 653,280.

*To all whom it may concern:*

Be it known that we, JOHN T. METCALFE and GARFIELD METCALFE, citizens of the United States, and residents of Quincy, in the county of Franklin and State of Pennsylvania, have invented a new and Improved Gearing for Traction-Engines, of which the following is a full, clear, and exact description.

Our invention is an improvement in traction engine transmission, and has for its object the provision of a transmission of the character specified especially adapted for use with explosion engines and capable of a plurality of forward and a reverse speed, wherein the motor is first yieldingly connected with the driven shaft, and afterward positively and rigidly connected.

In the drawings:—Figure 1 is a plan view of the frame of an engine provided with the improvement; Fig. 2 is a vertical longitudinal section; Fig. 3 is an enlarged plan view of the clutch; Fig. 4 is a side view of the same; Fig. 5 is a section on the line 5—5 of Fig. 4; Fig. 6 is a detail sectional view, on the line 6—6 of the same figure; and Fig. 7 is a perspective view of the operating mechanism for the toothed clutches.

The present embodiment of the invention comprises a shaft 1 journaled transversely of the frame 2 of the engine, and provided at one end with a gear wheel 3 which is adapted to be connected with the motor (not shown) for driving the said shaft. The frame is supported by the usual front wheels 4 journaled on the axle 5, pivoted to the frame at 6 and the axle is swung to guide the engine by the usual steering means (not shown) connected with the axle by the chains 7.

The rear axle 8 is connected to the rear of the frame 2 in any suitable manner and is provided with the usual wheels (not shown), and a gear wheel 9 is rigidly connected with each rear wheel. The gear wheels 9 are coaxial with the rear wheels, and each gear wheel is in mesh with a pinion 10 at the front thereof.

The pinions 10 are secured to the ends of a shaft 11 journaled in a housing 12 on the frame, in front of the axle 8, and a gear wheel 13 is secured to the shaft 11 inside the frame, and near one end of the shaft. The axle 8 is journaled in a housing 14 on the frame and the driver's or engineer's platform 15 is arranged behind the said housing. The gear wheel 13 meshes with a gear wheel 16, turning loosely on a countershaft 17, journaled in bearings 18 on the frame between the shaft 10 and the driving shaft 1. The said gear wheel 16 is near one end of the countershaft and inside the frame, and near the opposite side of the frame, a similar gear wheel 19 is keyed or otherwise secured to the countershaft.

Two gear wheels 20 and 20ª are journaled loosely on the driving shaft 1, one wheel near each side of the frame. The gear wheel 20ª is of larger size than wheel 20 and meshes with a gear wheel 21 running loosely on a second counter shaft 22, journaled below and between the shafts 1 and 17 in bearings 23 supported from the frame. The gear wheel 20 meshes with a gear wheel 24, keyed or otherwise secured to the same second countershaft 22, and gear wheels 21 and 24 mesh with gear wheels 13 and 19 respectively. Each of the said gear wheels 16 and 21 is provided with one section 25, of a toothed clutch, the other section 25ª of each clutch being mounted for longitudinal movement on its shaft on a feather or the like, toward and from sections 25. When the gear wheel 20 is connected to the driving shaft, the driven shaft is rotated through gear 20, gear 24, gear 19, gear 16 and gear 13. When gear 20ª is connected to the driving shaft, the driven shaft is rotated through gear 20ª, gear 21 and gear 13. When gear 20 is connected to the driving shaft, gear 24 is rotated rearwardly, gears 19 and 16 forwardly and gear 13 rearwardly, thus driving the supporting wheels forwardly. When gear 20ª is connected to the driving shaft, gear 21 is rotated rearwardly, gear 13 is rotated forwardly, and the supporting wheels are rotated rearwardly. Since the gear wheel 20 is of smaller diameter than wheel 20ª, countershaft 22 will be rotated at a higher speed when driven by wheel 20ª than when driven by wheel 20. Wheels 16 and 19 are similar as are also wheels 21 and 24 and wheels 10 on shaft 11 so that the same statement applies to the axle when driven by wheels 20 and 20ª. Each of the wheels 20 and 20ª is adapted to be connected to the driving shaft 1 by means of a friction clutch, shown in detail in Figs. 3 and 6 inclusive. As the clutches are of the same construction, but one is shown in detail, and but one will be described, namely that pertaining to wheel 20. Each of the gear wheels 20 and 20ª is secured on the hub 26 of a disk 27 having a lateral marginal flange 28, extending in the opposite direction from the hub 26. A bushing 29 is arranged between the hub and the gear wheel, and the hub and gear wheel are secured together by the key 30.

A split expanding ring 31 engages the inner face of the flange 28 and the said ring is connected to a hub 32 on the shaft 1 by means of a radial arm 33. The hub is secured to the shaft 1 by means of a wedge shaped or tapering key 34 which fits in registering keyways in the shaft and hub respectively. The rings 31 of the respective clutches are expanded by means of a double cam collar or sleeve 35, slidable on the shaft 1 between the clutches, and the collar or sleeve is operated by means of a fork 36, on a lever 37 which engages an annular groove 38 in the collar. The lever is pivoted at 39 on the frame and is operated by mechanism to be presently described in detail. The ends of the collar or sleeve 35 (Fig. 5) are rounded as shown at 40 and the said ends are adapted to engage the rounded end of a roller 41 journaled in one end of a substantially radial arm 42 secured to a pin 43 connected to one end of the expanding ring 31.

The pin 43 is provided with a head 44 and with a neck 45 between the head and the pin proper. The neck is engaged by a plate consisting of sections 46 and 47, each having a recess in its inner end for receiving the neck. The section 47 is secured to one end of the ring 31 by means of cap screws 48 (Fig. 6). The other section 46 of the plate is secured to the other end of the ring 31 by means of a screw 49 which passes through an opening 50 in the plate section, and an opening 51 in the ring end, and is threaded into a wedge shaped key 52 in the inner enlarged end of the said opening 51.

The key 52 and the opening have their contacting faces inclined in the same direction, (Fig. 6) and when the key becomes loose from any reason, the turning of the screw 49 in the proper direction will tighten the key. The pin 43 is provided at the end adjacent to the disk 27 with a lug 53, inserted in an opening in the pin and extending above the pin to engage the flange 28 to relieve the inner end of the pin from wear. The other end of the key 31 is connected to a lug 56 on the hub 32 by means of a bolt 57 which passes through the lugs 56 and through a lug 58 on the end of the ring. A plate 59 is supported by the bolt 57 and is provided with a fork at its free end, and the arms of the fork engage the head 60 of the bolt 49 to prevent turning thereof. The flange 28 is provided with an annular reinforcing rib 55, near the disk.

A vertical shaft 61 is journaled on the frame, between the countershafts, and a radial arm is secured to each end of the shaft. Each of the arms is provided with a roller 62 at its free end. The roller of the upper arm 63 engages a groove 64 in the clutch section 25ª on the shaft 17, and the roller of the lower arm 65 engages a similar groove in the clutch 25 of shaft 22. The arms 63 and 65 extend in opposite directions, and another arm 66 is secured to the shaft at its center. A link 67 is pivoted at one end to the outer end of arm 66. At its opposite end, the link is provided with two fixed collars 68, 69 spaced apart from each other.

A collar 70 is slidable on the link between the collars 68 and 69 and a spring 71 encircles the link, on each side of collar 70 between the same and collars 68 and 69. The collar 70 is provided with a lateral stem 72, which passes through an opening 73 intermediate the ends of a lever 73, and is engaged by a nut 74 on the opposite side of the lever. The lever is pivoted at one end to a standard 75, secured at 77 to the frame, and the opposite end of the lever is provided with a grip or handle 76. It will be obvious that when the shaft 61 is oscillated in either direction, the clutch on one of the countershafts 17 or 22 will be connected, while the other will be disconnected or released.

The lever 37 before mentioned, is as before stated, pivoted at 39 on the frame, the said pivotal connection being intermediate the ends of the lever. The opposite end of the lever is provided with a roller 78 which engages an inclined cam slot 79, in a cam plate 80 movable longitudinally in guides 81 on the frame. When the cam plate is moved longitudinally, the sleeve or collar 35 will be moved laterally to connect gear wheel 20 or 20ª to the driving shaft. The plate is moved by means of a lever 82, pivoted at its lower end to a lug 83 on the platform 15 and provided at its upper end with a handle or grip 84.

A link 85 is pivoted at one end, at 86 to the lever, intermediate the ends thereof, and the opposite end of the lever is provided with an angular portion 87 pivoted to the plate 80. When the lever is swung forwardly the plate will be operated to connect wheel 20 to the driving shaft and when moved rearwardly wheel 20ª will be connected, and wheel 20 released.

In operation, the lever 73 is thrown forwardly or rearwardly to connect wheel 21 with shaft 22 or to connect wheel 16 with shaft 17, if the teeth of the clutch parts 25, 25ª are not in register the spring 71 permit the complete movement of the lever 73, and the said complete movement locks the lever in the position to which it is thrown. When the lever 73 is thrown rearwardly for instance, wheel 16 is connected to shaft 17 if lever 82 is now moved forwardly wheel 20 is clutched to shaft 1 and a forward movement is imparted to rear axle 8 on the high speed. When the lever 73 is moved forwardly, wheel 21 is connected to shaft 22 and wheel 16 is disconnected from shaft 17. If now lever 82 is swung forwardly to connect wheel 20 to shaft 1, a forward movement is imparted to rear axle 68 on the low speed. Should lever 82 be swung rearwardly to connect wheel 20ª with shaft 1 (with the parts as above described), a rearward movement is imparted to axle 8. The transmission thus provides for two speeds forward and reverse.

The operator need pay no attention to clutches 25 25ª, that is, as to whether the teeth engage or not since the yielding connection between the link 67 and lever 73 permits the teeth to abut while the lever is completely thrown and as soon as the teeth register the springs 71 will press the teeth into engagement. When the lever 73 is thrown rearwardly, the wheel 16 is connected to the shaft 17. With lever 73 in this position, if wheel 20 is connected to the driving shaft, the supporting wheels are driven from gear wheel 20, gear wheel 24, gear wheels 19 and 16, gear wheel 13, pinions 10 and gear wheels 9. Should the lever 73 be thrown forwardly, gear wheel 21 is connected to shaft 22 and gear wheel 16 is disconnected from shaft 17. The forward movement of lever 82 connects wheel 20 to shaft 1, and the supporting wheels are moved forwardly through gears 20, 24, 21, 13, pinions 10 and gear wheels 9. When the lever 82 is moved in the opposite direction with the lever 73 in the forward position, wheel 20ª is connected with shaft 1, and drives the supporting wheel through gear 21, gear 13, pinions 10 and gear wheel 9. It will be evident that gear wheel 20 may drive the gear wheel 13 through gear wheels 24, 19 and 16, or through gear wheels 24, 21 and 13, while gear wheel 20ª may drive gear wheel 13 only through gear wheel 21.

We claim:—

1. In combination, a driven shaft, a gear wheel on the said shaft, a driving shaft, a gear wheel journaled loosely on the driving shaft near each end thereof, one of said wheels being of greater diameter, a friction clutch for connecting each wheel with the shaft, means for operating the clutches in alternation to connect one wheel to the shaft and release the other, a plurality of counter shafts arranged between the driving shaft and the driven shaft, a fixed and a loose gear wheel on each counter shaft, the fixed wheels meshing together, and one of the fixed wheels meshing with the small gear wheel on the driving shaft, said loose gears meshing with the gear wheel of the driven shaft, and one of the said loose gears meshing with the large gear wheel of the driving shaft, a toothed clutch for connecting each of the wheels to the shaft upon which it is journaled, means for moving said clutches in alternation to connect one wheel and disconnect the other, a link connected with the operating means and movable longitudinally to actuate the clutch, a lever pivoted at one end and slidably connected to the link intermediate its ends, and a spring on each side of the slidable connection.

2. In combination, a driven shaft, a gear wheel on the said shaft, a driving shaft, a gear wheel journaled loosely on the driving shaft near each end thereof, one of said wheels being of greater diameter, a friction clutch for connecting each wheel with the shaft, means for operating the clutches in alternation to connect one wheel to the shaft and release the other, a plurality of counter shafts arranged between the driving shaft and the driven shaft, a fixed and a loose gear wheel on each counter shaft, the fixed wheels meshing together, and one of the fixed wheels meshing with the small gear wheel on the driving shaft, said loose gears meshing with the gear wheel of the driven shaft, a toothed clutch for connecting each of the wheels to the shaft upon which it is journaled, and means for moving said clutches in alternation to connect one wheel and disconnect the other.

3. In combination, a driven shaft, a gear wheel on the driven shaft, a pair of countershafts adjacent to the driven shaft, a loose gear and a fixed gear on each shaft, the fixed gears meshing together and the loose gears meshing with the gear wheel of the driven shaft, a toothed clutch for connecting each loose gear to its shaft, a rock shaft journaled between the countershaft and having oppositely arranged arms connected with the clutches for alternately operating them to connect one gear wheel and to disconnect the other, a driving shaft, a pair of loose gears of unequal diameter on the driving shaft, each gear meshing with a gear on one of the countershafts, a friction clutch for connecting each gear to the driving shaft, means for operating said gears in alternation, a swinging lever on the frame, a link connected with the rock shaft for operating the same, a collar slidable on the link and pivoted to the lever, a fixed collar on each side of the sliding collar, and a spring between each fixed collar and the sliding collar.

4. In combination, a driven shaft, a gear wheel on the driven shaft, a pair of countershafts adjacent to the driven shaft, a loose gear and a fixed gear on each shaft, the fixed gears meshing together and the loose gears meshing with the gear wheel of the driven shaft, a toothed clutch for connecting each loose gear to its shaft, a rock shaft journaled between the countershaft and having oppositely arranged arms connected with the clutches for alternately operating them to connect one gear wheel and to disconnect the other, a driving shaft, a pair of loose gears of unequal diameter on the driving shaft, each gear meshing with a gear on one of the countershafts, a friction clutch for connecting each gear to the driving shaft, means for operating said gears in alternation, a swinging lever on the frame, and a yielding connection between the lever and the rock shaft for oscillating the said shaft.

5. In combination, a driven shaft, a gear wheel on the driven shaft, a loose gear and a fixed gear on each shaft, the fixed gears meshing together and the loose gears meshing with the gear wheel of the operating shaft, means for positively connecting the wheels to their respective shafts in alternation, means for operating the said means, a yielding connection between the said means and its operating means, a driving shaft, a loose gear wheel on the driving shaft meshing with each wheel on one of the countershafts, said gears being of unequal diameter, and a common operating means for connecting either wheel to the shaft.

6. In combination, a driven shaft and a driving shaft, a gear wheel on the driven shaft, a plurality of countershafts between the said shafts, a fixed gear on each countershaft meshing with the gear on the other countershaft, a loose gear on each countershaft meshing with the gear of the driven shaft, a loose gear on the driving shaft meshing with each gear on one of the countershafts, a common operating means for yieldingly connecting either of the said loose gears to the driving shaft, means for rigidly connecting either of the loose gears to the countershaft upon which it is journaled, a longitudinally movable link for operating the said means to connect said gears to the countershaft in alternation, a swinging lever, a collar slidable on the link and pivoted to the lever, a stop on the link on each side of the collar, and a spring between each stop and the collar.

7. In combination, a driven shaft and a driving shaft, a gear wheel on the driven shaft, a plurality of countershafts between the said shafts, a fixed gear on each countershaft meshing with the gear on the other countershaft, a loose gear on each countershaft meshing with the gear of the driven shaft, a loose gear on the driving shaft meshing with each gear on one of the countershafts, a common operating means for yieldingly connecting either of the said loose gears to the driving shaft, means for rigidly connecting either of the loose gears to the countershaft upon which it is journaled, means for operating the said means, and a yielding connection between the said operating means and the connecting means.

8. In combination, a driven shaft and a driving shaft, a gear wheel on the driven shaft, a plurality of countershafts between the said shafts, a fixed gear on each countershaft meshing with the gear on the other countershaft, a loose gear on each countershaft meshing with the gear of the driven shaft, a loose gear on the driving shaft meshing with each gear on one of the countershafts, a common operating means for yieldingly connecting either of the said loose gears to the driving shaft, and means for positively connecting either of the loose gears to the countershaft upon which it is journaled.

In testimony whereof we have signed our names to this specification in the presence of two subscribing witnesses.

JOHN T. METCALFE.
GARFIELD METCALFE.

Witnesses:
I. C. WALK,
R. B. HUNSECKER.

Copies of this patent may be obtained for five cents each, by addressing the "Commissioner of Patents, Washington, D. C."